(12) United States Patent
Garrido et al.

(10) Patent No.: US 12,511,781 B2
(45) Date of Patent: Dec. 30, 2025

(54) LANDMARK LOCALIZATION USING THREE-DIMENSIONAL TRANSFORMATIONS

(71) Applicant: Flawless Holdings Limited, London (GB)

(72) Inventors: Pablo Garrido, Hawthorne, CA (US); Xingzhe He, Vancouver (CA); Gaurav Bharaj, Santa Monica, CA (US)

(73) Assignee: Flawless Holdings Limited, London (GB)

( * ) Notice: Subject to any disclaimer, the term of this patent is extended or adjusted under 35 U.S.C. 154(b) by 382 days.

(21) Appl. No.: 18/352,062

(22) Filed: Jul. 13, 2023

(65) Prior Publication Data
US 2025/0022168 A1   Jan. 16, 2025

(51) Int. Cl.
*G06T 7/73* (2017.01)
(52) U.S. Cl.
CPC ...... *G06T 7/74* (2017.01); *G06T 2207/20081* (2013.01)
(58) Field of Classification Search
CPC ............. G06T 7/74; G06T 2207/20081; G06T 2207/20084
See application file for complete search history.

(56) References Cited

U.S. PATENT DOCUMENTS 11,398,255 B1   7/2022 Mann et al.
2020/0334867 A1* 10/2020 Chen ...................... G06T 11/00

OTHER PUBLICATIONS

Xiao et al: "Simple baselines for human pose estimation and tracking", ECCV, vol. 11210 of Lecture Notes in Computer Science, pp. 472-487. Springer, 2018.
Ronneberger et al: "U-net: Convolutional networks for biomedical image segmentation", In MICCAI, vol. 9361 of Lecture Notes in Computer Science, pp. 234-241, Springer, 2015.

* cited by examiner

*Primary Examiner* — Juan M Guillermety
(74) *Attorney, Agent, or Firm* — EIP US LLP

(57) ABSTRACT

A computer-implemented method comprises obtaining a source image and a target image, determining a first point cluster by processing the source image using a machine learning mode, determining a second point cluster by processing the target image using the machine learning model, uplifting the first point cluster to obtain an uplifted first point cluster, uplifting the second point cluster to obtain an uplifted second point cluster, estimating a transformation that maps the uplifted first point cluster to the uplifted second point cluster, applying the estimated transformation to the uplifted first point cluster to obtain a candidate reconstruction of the uplifted second point cluster, and updating the machine learning model to reduce a loss function including a term penalizing a difference between the uplifted second point cluster and the candidate reconstruction of the uplifted second point cluster.

20 Claims, 12 Drawing Sheets

LANDMARK LOCALIZATION USING THREE-DIMENSIONAL TRANSFORMATIONS

BACKGROUND OF THE INVENTION

Field of the Invention

The present invention relates to determining locations of landmarks in images or video.

Description of the Related Technology

Landmark detection or localization, also referred to as keypoint detection or localization, involves determining locations of salient points within an image or video. A landmark or keypoint may be semantically meaningful, for example corresponding to a given feature such as an anatomical feature. Alternatively, or additionally, a landmark or keypoint may be salient with regard to a particular downstream task, such as facial tracking and animation such as described in U.S. Pat. No. 11,398,255 (the entirety of which is incorporated for all purposes by reference). For such tasks, keypoints may be located for example along the lip contours of a human face. Various machine learning techniques have been applied to keypoint localization, such as generative methods in which a generative model is trained adversarially to generate image-annotation pairs.

Machine learning models for keypoint localization may be trained using either unsupervised or supervised methods. Unsupervised training methods may involve a variety of training objectives such as, for example, reconstruction of images from masked portions of the images and detected keypoints. Training methods based on image reconstruction may lose accuracy on images containing defects or resolution losses, deformable objects, articulations, appearance variations and occlusions.

Unsupervised training methods can result in models being ineffective for detecting keypoints in a semantically consistent manner as such models typically lack human interpretability due to the absence of human supervision. To remedy this deficiency, unsupervised methods may be combined with supervised training, for example by including manually annotated images in the training dataset. Due to the size of training datasets required, however, the task of manually annotating images can require annotators with domain expertise and be highly burdensome and prone to error, particularly in cases where an object in an image is occluded or otherwise inconspicuous to the annotator. Furthermore, methods in which manually annotated images are included in a dataset may require balanced data distributions and may result in trained models that are not transferrable between different object categories.

In some examples, a training objective for a keypoint localization model may exploit an invariance of a set of detected keypoints under a transformation, for example a planar similarity transformation. Such methods can have a limited range of applicability, for example because the invariance may not hold where large viewpoint variations are present within a dataset, breaking the invariance of the set of keypoints under such transformations.

SUMMARY

According to an aspect of the present disclosure, there is provided a computer-implemented methods. There is also provided a system comprising at least one processor and at least one memory holding instructions which, when executed by the at least one processor, cause the at least one processor to carry out the computer-implemented method. There is also provided one or more non-transitory storage media comprising instructions which, when executed by a computer, cause the computer to carry out the computer-implemented method.

The computer-implemented method comprises training a machine learning model to detect keypoints in images. The method includes obtaining a source image and a target image from a set of images, processing the source image using the machine learning model to determine a first point cluster comprising points representing candidate keypoints in the source image, processing the target image using the machine learning model to determining a second point cluster comprising points representing candidate keypoints in the target image, uplifting the first point cluster in a three-dimensional space to obtain an uplifted first point cluster, uplifting the second point cluster in the three-dimensional space to obtain an uplifted second point cluster, estimating a transformation in the three-dimensional space that maps the uplifted first point cluster to the uplifted second point cluster, applying the estimated transformation to the uplifted first point cluster to obtain a candidate reconstruction of the uplifted second point cluster in the three-dimensional space, and updating the machine learning model to reduce a loss function. The loss function includes a term penalizing a difference between the uplifted second point cluster and the candidate reconstruction, in the three-dimensional space, of the uplifted second point cluster.

The source image and the target image may depict a same object. Penalizing a difference between the uplifted second point cluster and the candidate reconstruction enforces a three-dimensional similarity between the first point cluster and the second point cluster, thereby improving the ability of machine learning model to accurately detect keypoints in two dimensions whilst providing information about locations of the keypoints in a third dimension as a by-product. Furthermore, enforcing three-dimensional similarity during training may prevent the machine learning model from generating outliers, particularly when objects depicted by the source image and the target have rigid or articulated portions or a combination thereof. The estimated transformation may be composed of one or more component transformations that may each be applied to a subset of the points in a point cluster, and may transform different points in different ways and to varying extents, enabling the machine learning model to learn to correctly predict locations of points even under significant object articulation or partial deformation of an object.

Uplifting each of the determined point clusters to the three-dimensional space may include using the machine learning model to estimate a value of a depth coordinate for each point in said point cluster. Estimating the value of the depth coordinate may include using the machine learning model to determine a respective depth-aware map and a respective heatmap, and calculating a sum of elements of the respective depth-aware map weighted in dependence on elements of the respective heatmap.

Obtaining the target image may include evaluating differences between the source image and other images in the set of images, and selecting the target image as one of said other images having a least difference from the source image. In this way, the transformation in the three-dimensional space is applied to relatively closely related images, for which the similarity constraint is likely to hold more accurately. As a result, the effectiveness of the training objective may be enhanced.

The computer-implemented method may include randomly selecting the source image and the target image from a set of images.

The loss function may include a term penalizing a difference between the first point cluster for the source image and a set of keypoint annotations for the source image (or between the second point cluster for the target image and a set of keypoint annotations for the target image). Combining the loss function terms described above with such a term may prevent the decoder portion of the machine learning model from overfitting in examples where few sets of keypoints annotations are available, enabling the training method to be applied in a few-shot setting where only a relatively small number of images have keypoint annotations.

The computer-implemented method may include partitioning the set of images into a plurality of partitions (for example disjoint partitions), selecting a representative image from each partition, the representative image designating a centroid of a variation amongst images in the partition, and annotating the representative image from each partition with a respective set of keypoint annotations. The representative image from a first partition of the plurality of images may be the source image (or the target image), for which a set of keypoint annotations may be provided as described above. By annotating representative images from partitions of the set of images, the machine learning model is trained to detect keypoints more robustly when there is significant object articulation in the set of images.

According to a further aspect of the present disclosure, there is provided a memory such as a non-transitory storage medium holding data representing a detector portion of a machine learning model trained to detect keypoints in images using any of the above methods.

Further features and advantages of the invention will become apparent from the following description of preferred embodiments of the invention, given by way of example only, which is made with reference to the accompanying drawings.

DETAILED DESCRIPTION OF CERTAIN INVENTIVE EMBODIMENTS

Figure 1:
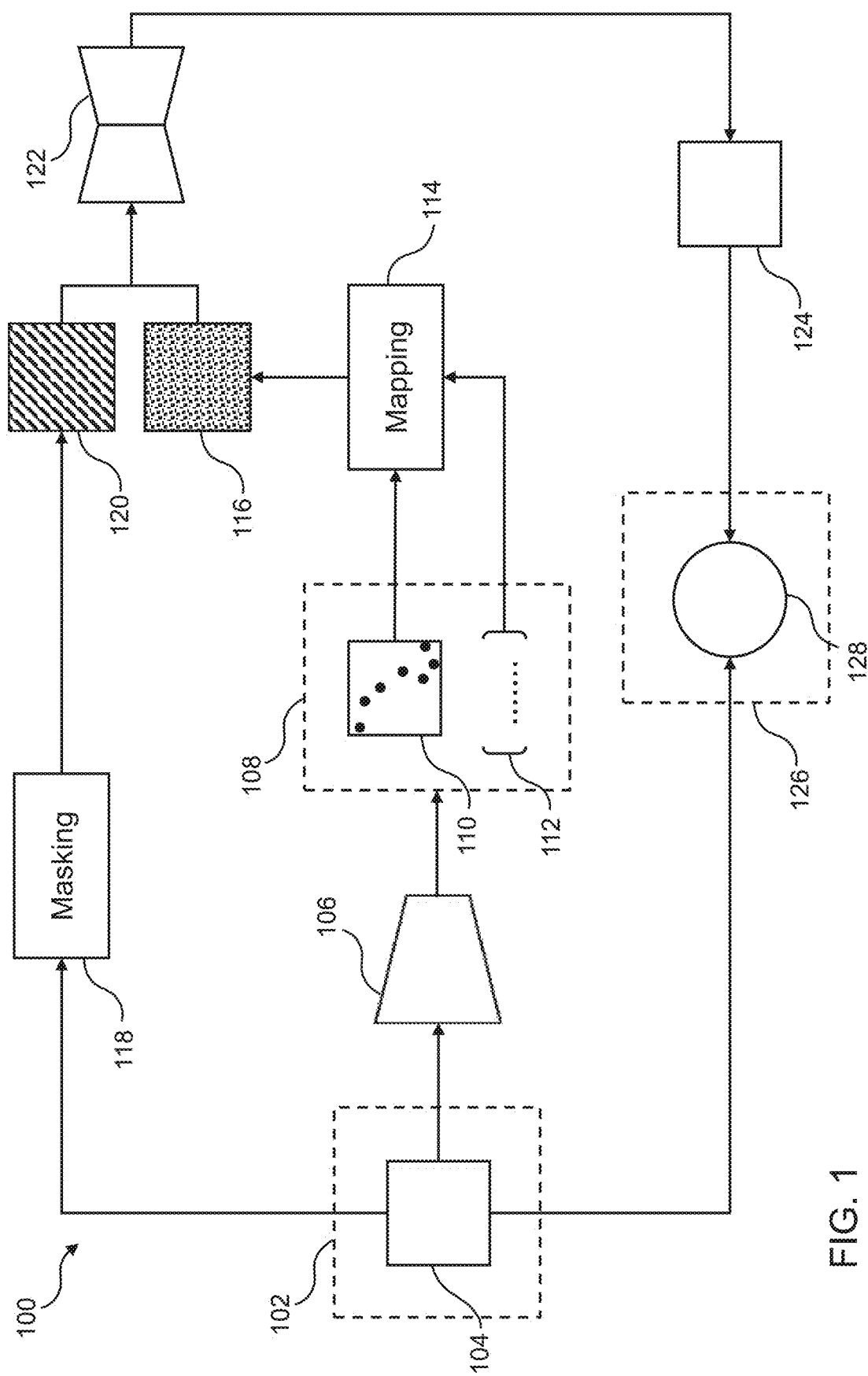
FIG. 1 schematically illustrates an example of a method of training a machine learning model to identify locations of keypoints in images.

FIG. 1 schematically illustrates an example of a computer-implemented method 100 of training a machine learning model to identify keypoints in images, using a set of training images 102. FIG. 1 shows a single training iteration, and the training process may include multiple training iterations. An image in the set of images 102 may be a two-dimensional array of pixels, each pixel having one or more colour channels according to a colour model such as an RGB, CMY, or CMYK colour model. Locations within an image may be denoted by coordinates, for example Cartesian coordinates. The coordinates may, for example, be normalised to a range between 0 and 1 in each spatial direction. In such examples, normalised coordinates denoted by x may be represented mathematically on a unit square as, for example, $x \in [0,1]^2$. The set of images 102 may, in principle, include images of varying resolutions or sizes (i.e. different array sizes).

The method 100 may proceed by selecting an image 104 from the set of images 102. The selecting of the image 104 may be (pseudo) random or deterministic. In this example, the selected image 104 is subject to two sequences of operations in parallel. A first sequence of operations includes providing the selected image 104 as input to an encoder 106 of the machine learning model. The encoder 106 may also be referred to as a detector. The encoder 106 may include one or more layers of an artificial neural network whose connection weights are adjusted and learned over the training process. At least some of the layers of the encoder 106 may be partially pre-trained prior to the method 100 taking place, or parameter values of the encoder 106 may be initialised in a different fashion, for example randomly. The encoder 106 may for example include a residual neural network (ResNet) with upsamplings, as described in the article Simple baselines for human pose estimation and tracking. In ECCV, volume 11210 of *Lecture Notes in Computer Science*, pages 472-487. Springer, 2018, the entirety of which is incorporated by reference for all purposes. Other examples may include other neural network architectures or models such as twin networks and/or fully convolutional networks. In further examples, the encoder 106 may include any other type of machine learning model capable of being trained for image feature recognition, such as a Gaussian Process model. The encoder 106 may also include one or more components such as image filters, which may assist the identification of candidate keypoints for the selected image 104. Regardless of the models or neural network architectures included in the encoder 106, a goal of the method 100 is to train the encoder 106 to accurately detect keypoints in images.

The encoder 106 processes the selected image 104 to generate a set of outputs 108 containing at least a point cluster 110 and a set of uncertainties 112. The point cluster 110 contains candidate keypoints for the selected image 104. In practice, the point cluster 110 may be stored as an array of coordinates representing locations of the candidate keypoints on the image. In FIG. 1, an illustrative point cluster 110 (in the shape of the Big Dipper group of stars from the constellation Ursa Major) is shown within the frame of the selected image 104. Locations of the candidate keypoints may depend on the content of the selected image 104 and the processing by the encoder 106. As will be explained in more detail hereinafter, the identified candidate keypoints may have a direct semantic relationship with the content of the image. For example, for use cases such as facial animation, it may be desirable to identify candidate keypoints along the contours of lips in an image containing a human face. In other examples, there may not be an evident semantic relationship between candidate keypoints in the point cluster 110 and the image content. Such examples may arise, for instance, where keypoints are obscured or difficult to recognise due to articulation or occlusion of objects in the selected image 104 or due to the inherent complexity of the image content.

In some examples, coordinate locations of candidate keypoints in the point cluster 104 may be generated as direct outputs of the encoder 106. In other examples, candidate keypoints may be obtained via one or more intermediate operations performed on outputs of the encoder 106. For example, locations of the candidate keypoints in the point cluster 110 may be calculated from a set of heatmaps generated by the encoder 106. In such examples, a heatmap for a given candidate keypoint may be a two-dimensional array containing heatmap values each indicating a likeliness of a candidate keypoint to be situated at a corresponding location in the selected image 104. Optionally, the heatmap values may be normalised, such as using a softmax function, so that the normalised heatmap values express predicted probabilities of the candidate keypoint being situated at the corresponding location in the selected image 104. Candidate keypoints in the point cluster 110 may then be assigned coordinates based on the heatmap values, for example coordinates that correspond to a maximum predicted probability. In another example, the coordinates may be calculated as a mathematical mean or expectation value of the keypoint location by determining, for instance, a sum of pixel coordinates weighted by the probability values. Besides representing coordinate locations for points in an image as describe above, candidate keypoints may alternatively represent finite-sized regions or segments of an image. The regions may, for example, represent features or landmarks of interest in the selected image 104. In such cases, a representation of a candidate "keypoint" may be different from a coordinate representation.

The set of outputs 108 of the encoder 106 additionally include a set of uncertainties 112. In this example, the individual uncertainties are numbers, with each number corresponding to a point in the point cluster 110. Analogously to the method of obtaining points in the point cluster 110, the set of uncertainties 110 may either be obtained as a direct output of the encoder 106 or may be obtained via a number of intermediate calculations performed on outputs of the encoder 106 (for example, different outputs to those used to determine the heatmaps). For example, each uncertainty in the set of uncertainties 112 may be calculated from a respective uncertainty map corresponding to a candidate keypoint in the point cluster 110. In such examples, an uncertainty map may be a two-dimensional array generated as an output of the encoder 106. In some examples, the value of an uncertainty in the set of uncertainties 112 may be obtained as a mathematical mean or expectation value of elements of the uncertainty map. For instance, the value of the uncertainty for a keypoint may be determined as a sum of elements of the uncertainty map weighted by the corresponding probability values or heatmap values for that keypoint, calculated as described above. In other examples, an uncertainty in the set of uncertainties 112 may be calculated from the uncertainty map using other means. An uncertainty value assigned to an identified candidate keypoint may serve to quantitatively indicate a confidence in the precision of the predicted location for the candidate keypoint. The uncertainty value may also serve to indicate the significance of a candidate keypoint with regard to reconstruction of the image as discussed hereinafter. Similar principles apply when candidate keypoints represent more finite regions or segments of the selected image 104.

The uncertainties 112 are subject to a mapping operation 114. The mapping operation 114 may include algorithmic and mathematical manipulation of the point cluster 110 and the set of uncertainties 112 to obtain a differentiable map 116 representing the point cluster 110 and a variation of uncertainty associated with the point cluster 110. The map 116 may be differentiable with respect to outputs of the encoder 106. For example, the map 116 may depict the points in the point cluster 110, where the depiction of a characteristic has a characteristic such as brightness or colour dependent on the uncertainty value allocated to the point. In another example, the map 116 may indicate varying contours of uncertainty derived from the set of uncertainties 112 in combination with the locations of the respective points in the point cluster 110. Such contours may be obtained by interpolation over the set of points in the point cluster 110, for example using a two-dimensional interpolating Lagrange polynomial.

The resulting map 116 may thus indicate regions of high and low confidence in the identified locations of candidate keypoints in relation to the selected image 104. In other examples, the map 116 may depict connections between certain pairs of points of the point cluster 110, each depicted connection having a characteristic dependent on the uncertainties of the corresponding connected points. In such examples, the map 116 may be referred to as an uncertainty-aware edge map. Methods of generating an uncertainty-aware edge map are described in more detail with reference to FIGS. 3 and 4.

A second sequence of operations in FIG. 1 includes subjecting the selected image 104 to a masking operation 118. Masking of an image may include occluding certain pixels of the image from further processing. The masking operation 118 may for example include setting certain pixel values to zero or another predetermined value. In the context of images, masked locations for the selected image 104 may be recorded in a masking array. The pixels of the image 104 masked during the masking operation 118 may be chosen randomly or deterministically. The masking operation 118 results in a masked image 120 containing a portion of the selected image 104 which is available for further processing. In some examples, the portion of the selected image 104 may include a single connected region of the image. In other examples, multiple disconnected regions may be included in the portion of the image. In some examples, over 50%, over 70% or over 90% of the total image may be masked during the training process.

Once obtained, the differentiable map 116 and the masked image 120 are provided together as inputs to a decoder 122 of the machine learning model. The decoder 122 may contain one or more connected layers of an artificial neural network with connection weights that are adjusted and learned over the training process. At least some of the layers of the decoder 122 may be partially pre-trained prior to the method 100 taking place, or parameter values of the decoder 122 may be initialised in a different fashion, for example randomly. The decoder 122 may for example include a convolutional neural network such as a U-Net as described in the article U-net: Convolutional networks for biomedical image segmentation. In MICCAI, vol. 9361 of *Lecture Notes in Computer Science*, pages 234-241, Springer, 2015, the entirety of which is incorporated herein for all purposes. Other machine learning models may also be included in the decoder 122. Regardless of the machine learning models included in the decoder 122, a goal of the decoder 122 is to process the map 116 and the masked image 120 to generate a candidate reconstructed image 124.

The machine learning model may be updated to reduce a loss function 126. For example, parameter values of the machine learning model may be updated using backpropagation of the loss function followed by gradient descent or a variant thereof. The loss function 126 may include a term 128 containing a difference between at least one representation of the selected image 104 and a corresponding at least one representation of the generated candidate reconstructed image 124. A difference between the two images may be quantified by an appropriate mathematical metric such as a metric induced by a norm. For example, an $L^1$ norm (which derives the so-called Manhattan distance) or a smoothed $L^1$ norm may be used, though an $L^2$ norm or a p-norm with p>1 or an infinity norm may also be used. Other suitable metrics may be used to quantify a difference between two images, such as structured similarity (SSIM) loss, Frechet inception distance (FID), or any variant thereof. A difference between two images may also be quantified by calculating domain-specific mathematical functions of the individual images or on a pixel-wise difference of the images. Other representations of the images may additionally, or alternatively, be compared in the loss function term. For example, perceptual deep metrics, such as a ViT perceptual loss, may be used. In such metrics, activations of neurons from one or more layers of a neural network may serve as an abstract representation of an image. The loss function term 128 may include calculating a combination of one or more such losses. In one example, relative contributions of a perceptual loss and a pixel-wise loss to the loss function term 128 may be calibrated (manually or learned during training) using multiplicative coefficients.

By penalizing a difference between the selected image 104 and the candidate reconstructed image 124, the loss function 126 encourages the machine learning model to improve its ability to reconstruct images and thereby to improve its predictions of candidate keypoints for images in the set of images 102. Thus, in this example, training is shown to be conducted in an end-to-end manner involving adjusting and learning connection weights in the neural networks included in both the encoder 106 and the decoder 122. This end-to-end training may force the machine learning model to encode sufficient information in the map 116 to accurately reconstruct the selected image 104. By providing the decoder 122 with a masked version 120 of the selected image 104, the machine learning model is forced to learn indicative characteristics and features of the selected image 104 from relatively little information. The machine learning model is thereby persuaded to rely on the map 116 to obtain the remaining information required for accurate reconstruction. The requirement, in turn, encourages the machine learning model to better predict the point cluster 110 and the set of uncertainties 112, which together determine the map 116. The machine learning model thus may be expected to learn to "detect" locations of candidate keypoints in the point cluster 110 that lead to a favourable outcome in terms of image reconstruction. By allowing the machine learning model to simultaneously predict a set of uncertainties 112, it is provided with a capacity to identify candidate keypoints obscured by occlusions or defects by way of assigning an appropriate value of uncertainty to the corresponding point in the point cluster 110. For example, the machine learning model may be able to detect significantly occluded features of a face such as mouth interior in the context of facial animation. Occlusions may be understood to include both self-occlusions and occlusions of objects by another object represented within the selected image 104. Defects may include blur effects, errors due to downsampling prior to inclusion in the dataset, harsh appearances, and temporal inconsistencies or lighting variations especially in video related images. The map 116 thus encodes a combination of two distinct types of information available from the point cluster 110 and the set of uncertainties 112 respectively. As discussed hereinafter, it may be beneficial to encode further information into the map 116 of uncertainty variation, such as semantic information with the help of user input. By relying on the map 116 to obtain an accurate reconstruction 124 of the selected image 104, the machine learning model is trained to locate keypoints in a manner that enables the image content to be synthesised. In examples where images contain semantically meaningful objects, it may be possible to synthesise photo-realistic representations of the objects using a trained version of the encoder 106 of the machine learning model.

Although FIG. 1 shows a single training iteration, in practice, the overall training process may involve many iterations, with each iteration selecting a different image from the set 102. In some examples, one or more of the training iterations may exclude one or more of the steps shown in FIG. 1. Similarly, examples are possible in which one or more iterations of the training process involve additional steps. Furthermore, the degree to which operations such as mapping 114 and masking 118 are applied may be varied over successive training iterations. Such variations may be conducive to the stability and efficiency of the optimisation. Convergence may be achieved both in a more stable manner or in a more efficient manner by performing heuristic adaptations of the training process.

Figure 2:
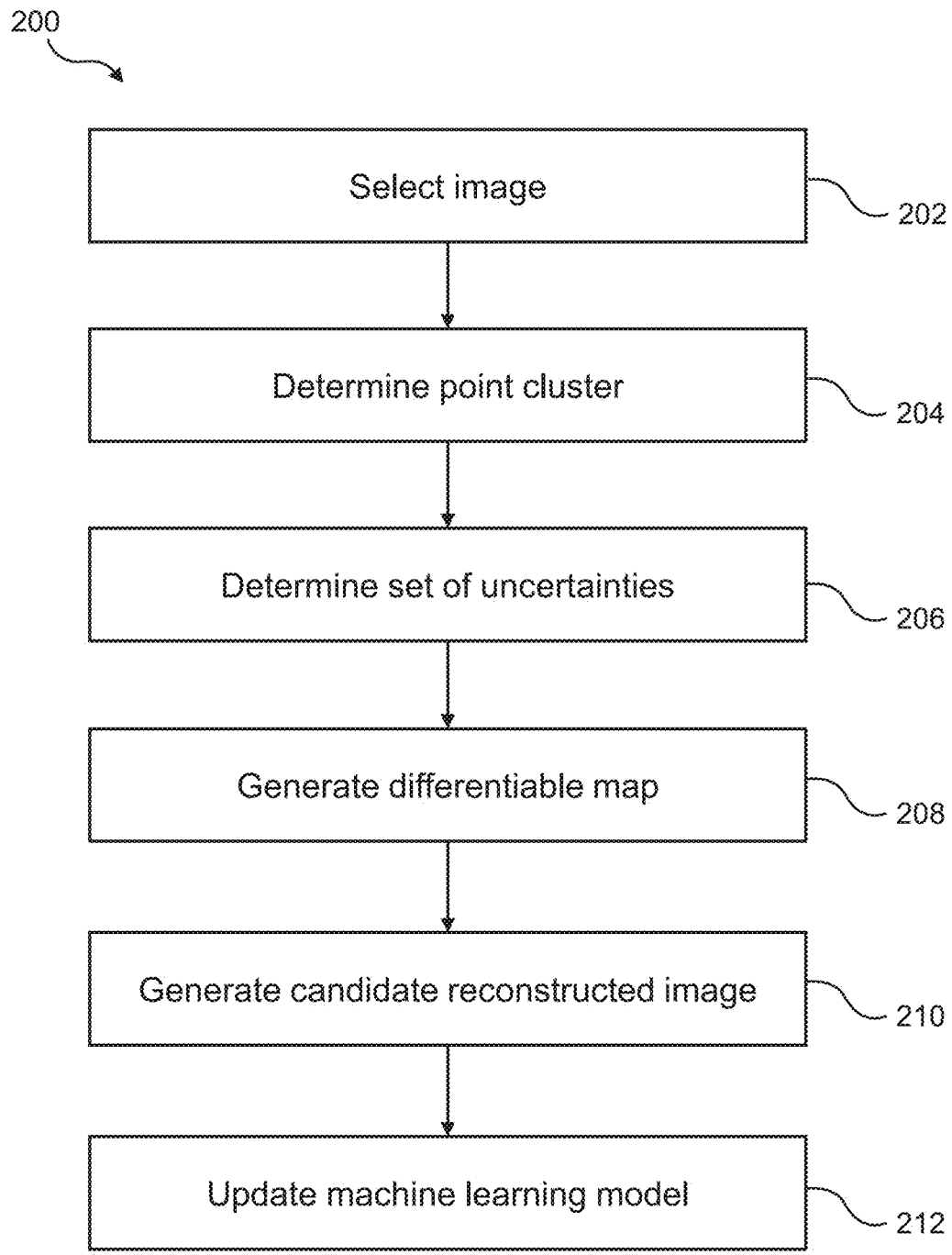
FIG. 2 shows a flow diagram representing an example of a method of training a machine learning model to identify keypoints in images.

FIG. 2 shows a flow diagram 200 of the steps involved in an example of a method of training a machine learning model to detect keypoints in images. In step 202, an image is selected, for which a point cluster is determined in step 204. The point cluster may comprise points representing candidate keypoints in the selected image. In step 206, a set of uncertainties is determined, which uncertainties may correspond to a respective point the detected point cluster. Using the determined point cluster and the set of uncertainties, in step 208, a map is generated. The map may represent the point cluster and a spatial variation of uncertainty associated with the point cluster. The map may be combined with a portion of the selected image and may then processed to generate a candidate reconstructed image in step 210. The machine learning model is updated based on a comparison of the candidate reconstructed image and the selected image in step 212. Updating the machine learning model may include reducing a loss function comprising a term penalizing a difference between at least one representation of the selected image and a corresponding at least one representation of the candidate reconstructed image.

Figure 3:
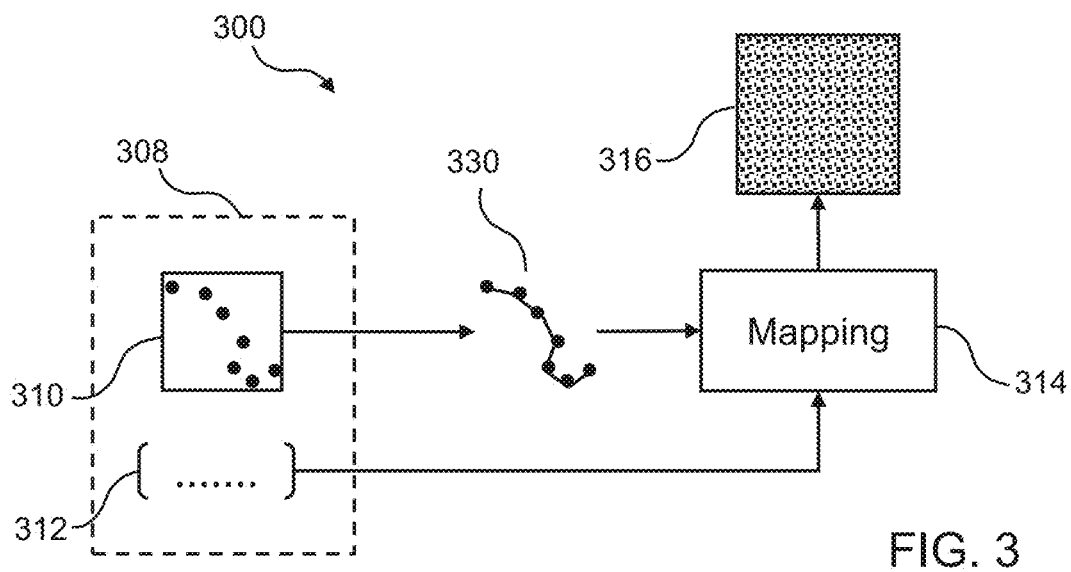
FIG. 3 schematically illustrates a first example of a method of generating an uncertainty-aware edge map for use in training a machine learning model.

FIG. 3 shows an example of a method 300 of obtaining an uncertainty-aware edge map depicting connections or links between certain pairs of points of the point cluster. For consistency between the figures, reference numerals for substantially corresponding steps of the method 300 and the method 100 have been chosen to be congruent modulo 100. Analogously to the generation of the map 116 in method 100, the method 300 includes processing a set of outputs 308 of an encoder portion of a machine learning model, the set of outputs 308 comprising a point cluster 310 and a set of uncertainties 312. The method 300 may further include a mapping operation 314 that results in a map 316 based on the point cluster 310 and the set of uncertainties 312. In this example, the mapping operation 314 is arranged to take a graph 330 as an input. The graph 330 may comprise nodes representing points in the point cluster 310 and may further comprise one or more edges representing pairwise links between nodes. An edge linking two nodes of the graph may denote a relationship, for example a semantic relationship or a rigid physical connection, between the corresponding points in the point cluster 310 represented by the nodes. For example, the graph 330 shown in FIG. 2 depicts edges as linking neighbouring stars along the contour of the Big Dipper group of stars. In other examples, nodes representing points of a single semantic class or object may be linked by edges of the graph.

The way in which connections corresponding to the edges of the graph are depicted in the map 316 may depend on uncertainty values of points linked by the edges of the graph. For example, a brightness, colour, or thickness of a depiction of an edge may vary in dependence on the uncertainty values. In this way, the map 316 may indicate confidence in the relative locations of points corresponding to the nodes linked by the respective edges. By indicating a relationship between points linked by edges, the graph 330 may serve to influence the mapping operation 314 and the resulting map 316. Information relating to the proximity between points may be beneficial for achieving the training objective more efficiently. In the context of method 100, for example, providing the graph 330 as input in the mapping operation 116 may help the machine learning model learn to reconstruct images more efficiently and/or more effectively.

The graph 330 included in FIG. 3 may be obtained by human input. For example, a user may prescribe a list of node pairs (representing pairs of points from the point cluster 310) linked by edges prior to or as part of the method 100. In other examples, the graph 330 may be obtained by using a partially pre-trained model. Regardless of the relationship between linked nodes indicated by an edge, a goal of using the graph 330 is to provide information that is beneficial for achieving the training objective of accurately reconstructing images.

Figure 4:
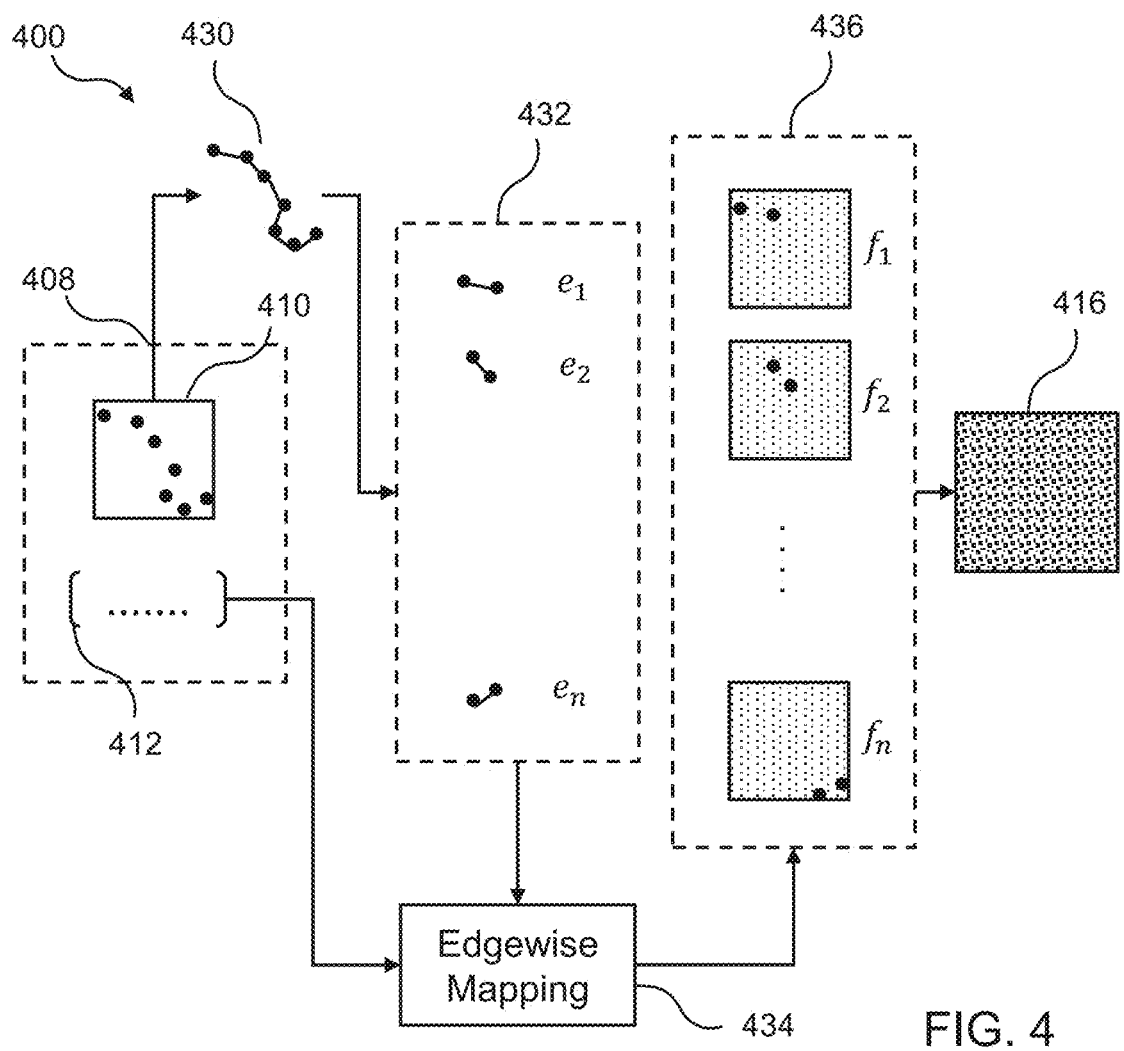
FIG. 4 schematically illustrates a second example of a method of generating an uncertainty-aware edge map for use in training a machine learning model.

FIG. 4 shows a further example of a method of generating a differentiable map depicting connections or links between certain pairs of points of the point cluster. Similarly to the method 300 of FIG. 3, the method 400 shown in FIG. 4 includes processing a set of outputs 408 of an encoder of a machine model to generate a map 416 for use in reconstructing an image. The method 400 further includes obtaining a set of edges 432 of the graph 430. Each edge in the set of edges 432 links a pair of nodes that, in turn, correspond to a pair of points in the point cluster 410. In FIG. 4, edges of the graph 430 have been labelled as $e_1, e_2, \ldots, e_n$ where n is the total number of edges. In some examples, the set of edges 432 may be available as part of the specification of the graph 430 and may, therefore, not require further processing of the graph 430. In other examples, the set of edges 432 may not be in one-to-one correspondence with the edges of the graph 430. For example, edges may be added to or removed from the set of edges 432, thereby disrupting a correspondence between the set of edges 432 and edges of the graph 430. Such additions or deletions of edges may be carried out manually by a user or automatically in dependence on certain criteria, for example uncertainties associated with one or more of the corresponding pair of points being below a threshold value. Including such auxiliary keypoints may enable learning the optimal keypoint structure and constraints to model natural part-based deformations.

The set of edges 432 may be provided as input along with the set of uncertainties 412 to an edgewise mapping operation 434. The edgewise mapping operation 434 may produce a set of edge map components 436, labelled in the figure as $f_1, f_2, \ldots, f_n$ where n is the number of edges, in correspondence with the set of edges 432 of the graph 430. Analogously to the output of the mapping operation 316 in FIG. 3, each edge map component $f_i$ may represent a map indicating a spatial variation of uncertainty in relation to the pair of points linked by the edge $e_i$ in the set of edges 432. The subscript i here denotes the index that may, for instance, take an integer value from 1 to n. For example, the edge map component $f_1$ may represent a spatial variation of uncertainty for the points linked by the edge $e_1$. Similarly, $f_2$ may correspond to $e_2$ and so on. Following the discussion above, the spatial variation of uncertainty (or contours thereof) represented by an edge map component $f_i$ may be determined during the edgewise mapping operation 434 by interpolating between uncertainty values of the points connected by the corresponding edge et. The interpolating may be linear or nonlinear interpolation. In this way, the edge map component may continuously vary between a region of higher uncertainty associated with a first point and a region or lower uncertainty associated with a second point.

Due to the independence of the uncertainty values in the set of uncertainties 112, different points in the point cluster 110 as well as different points linked by an edge may correspond to different uncertainty values. The resulting map 116 may thereby contain relevant information for reconstruction of an image that has defects or large variations (for example, lighting variations) between connected keypoints.

In one example, the edge map component $f_i$ may be computed using an edge function based on uncertainties of candidate keypoints $k_l$ and $k_m$ connected by the edge. The edge function may be determined at a given location in dependence on an edge parameter, which may be a function of the coordinates of the points connected by the edge. In a specific example, the value of the edge parameter t for an edge between candidate keypoints $k_l$ and $k_m$, at a pixel location p, may be given by $t=(p-k_l)\cdot(k_l-k_m)/\|k_l-k_m\|_2^2$, where $\|\cdot\|_2$ represents the $L^2$ norm. In this example, the edge function may be computed as a function, for example a sigmoid function, of the edge parameter t as follows:

$$d_{lm}(p) = \begin{cases} \|p - k_l\|_2^2 & \text{if } t \leq 0 \\ \|p - (k_l + tk_m)\|_2^2 & \text{if } 0 < t < 1 \\ \|p - k_m\|_2^2 & \text{if } t \geq 1 \end{cases}$$

The edge map component may be further dependent on a distance function defined on the selected image 102 in dependence with the edge parameter t. For example, the distance function may be defined as:

$$v_{lm}(p) = \begin{cases} \text{sigmoid}(v_l) & \text{if } t \leq 0 \\ \text{sigmoid}((1-t)v_l + t\, v_m) & \text{if } 0 < t < 1 \\ \text{sigmoid}(v_m) & \text{if } t \geq 1 \end{cases}$$

Where $v_l$ and $v_m$ are the values of uncertainty corresponding to the candidate keypoints $k_l$ and $k_m$. The edge map component may subsequently be a function of a combination of the edge function and the distance function and an adjustable edge map component variable. For example, the edge map component may be computed as a Gaussian function $S_{ij}$ extended along the line joining the points connected by the edge connecting the candidate keypoints $k_l$ and $k_m$ as $S_{lm}(p) = \exp(-v_{lm}(p)d_{lm}^2/\sigma^2)$ such that the values of the edge map may thus decrease exponentially away from the line joining the candidate keypoints points joined by the edge. The variance of the Gaussian function, represented by the edge map component variable, may characterise the spread of edge map away from the line. In this example, the differentiability of the Gaussian function permits an optimal value of the edge map component variable to be learned over the course of training.

Similarly, differentiability of the edge map component with respect to the edge function may the trainable parameters associated with the edge function to be computed via backpropagation and gradient descent, or a variant thereof. Here, the example has been elaborated for a Gaussian function; in practice, another differentiable function may be employed to compute the edge map component $f_i$. Computing an edge function in such a manner as, for example, based on an edge parameter renders the resulting map a characteristic variation relative to the edge. In examples where the graph 430 is prescribed using human input, the relationship of the uncertainty variation to the edge et of the graph 430 may serve to provide a basis for learning a semantically consistent differentiable map. Regardless of the functions employed for calculating the edge map component $f_i$, a goal of the edgewise mapping 434 is to generate maps of uncertainty variation corresponding to edges of the graph 430.

Edge map components in the resulting set of edge map components 432 may be further processed to produce an uncertainty-aware map 416 for the point cluster 410. For example, one or more edge map components may be combined into a single map using a pixelwise sum, average, or maximum operation. Taking the pixelwise maximum may preclude entanglement of edge map component values with the convolution kernel weights of a neural network included in the machine learning model. The result of the pixelwise operation may optionally be multiplied by a trainable coefficient to obtain the map 416. In some examples, the trainable coefficient may be enforced to be positive using operations, such as SoftPlus, to maintain positivity of the map 416.

Figure 5:
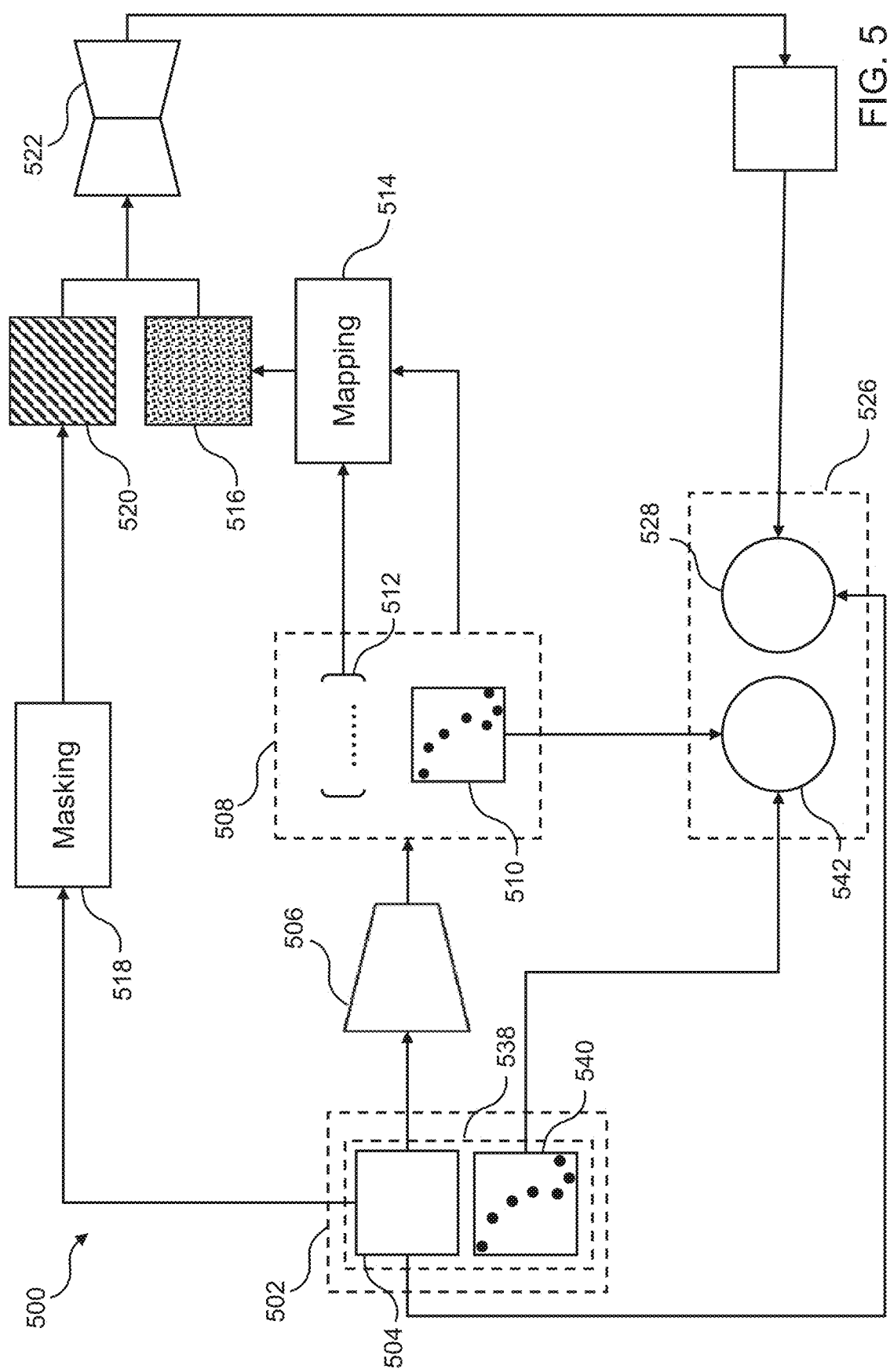
FIG. 5 schematically illustrates an example of a method of a machine learning model to identify locations of keypoints in images supplemented by supervision.

FIG. 5 schematically illustrates an example of a method 500 of a machine learning model to identify locations of keypoints in images supplemented by supervision. In the example shown in FIG. 5, components of the example method 100 shown in FIG. 1 have been included (with reference numerals being congruent modulo 100). In other examples, one or more components of other methods described thus far may also be included in the method 500. In addition, FIG. 5 shows a subset of the set of images 502 as annotated images 538. The annotated images 538 may be selected randomly from a larger set of annotated images available a priori. In this example, the selected image 504 is shown to be provided with a set of keypoint annotations 540. In other examples, the selected image may not be one of the annotated images. An annotation in the set of keypoint annotations 540 may indicate coordinates of a keypoint in the point cluster 510. The indicated coordinates in the set of keypoint annotations 540 may not be identical to the corresponding locations in the point cluster 510 detected by the encoder 506. For example, FIG. 5 shows the set of keypoint annotations 540 having a different set of stellar locations for the Big Dipper group from the respective set of locations in the detected point cluster 510. As shown in the example, an additional loss function term 542 is included that serves to penalize such deviations between the indicated set of keypoint annotations 540 and the detected point cluster 510 for each image in the subset 538 of annotated images. In some examples, the loss function term 542 may include an average distance between the coordinates. Alternatively, deviations may be calculated by relying on one or more mathematical or algorithmic operations as discussed hereinbefore. Deviations between the points may also be penalized analogously to the discussion hereinbefore as, for example, by updating the parameter values of the machine learning model using backpropagation of the loss function followed by gradient descent or a variant thereof.

The indicated coordinates in the set of annotations 540 may be provided manually prior to a training iteration. Manual annotation of points may provide a semantic shape constraint and thereby introduce a baseline for semantic consistency in the point clusters detected by the decoder 506. The machine learning model may thus be able to recognise candidate keypoints in the point cluster 510 conforming with a semantically consistent ground truth. For example, for the facial animation use case, manually annotated keypoints along the contours of human lips or eyes may provide semantic consistency to a machine learning model trained, for example, based on image reconstruction as an objective. Over the course of training, the machine learning model may also learn to detect a set of uncertainties 512 that favour the detection of semantically consistent point clusters 510. In this manner, the machine learning model may learn to "see through" occlusions, deformations, and image defects, for example, by virtue of the supervision gained through image annotations. Conversely, the use of a training objective such as image reconstruction may reduce the number of annotated images required to achieve a satisfactory level of semantic consistency. Use of self-supervised training objectives may also help mitigate the chance of overfitting that may otherwise occur in a purely supervised setting, and allow the possibility of generalising to a broad target distribution. Thus, the use of the loss function term 542 in conjunction with other loss function terms, such as 528, may reduce the burden of manually annotating images in the set of images 502. In some examples, up to 10, up to 20, or up to 50 annotated images may yield satisfactory results on a set of images 502 containing a relatively large number of images, such as thousands or tens of thousands of images. These numbers of annotated images stand in stark contrast to the typically hundreds or thousands of annotated images required by conventional training methods including supervision. An advantage of the method 500 therefore is to achieve such synergistic effects arising due to the combination of various loss function terms employed in the loss function 526, and thereby significantly reducing the number of annotated images required for satisfactory performance. The loss function terms 528 and 542 may be weighted by coefficients that act as hyperparameters to tune the relative significance of each of the training objectives. Such hyperparameters may be learned over the course of training.

Performance of the method 500 may be affected by the method of selecting images for annotation in the set of images 504. In one example, the set of images 504 may be partitioned into a number of clusters (for example disjoint clusters) and a representative image may be selected from each cluster for annotation. For example, in k-means clustering, a content space of the set of images 504 may be partitioned into a number (k) of Voronoi cells (clusters). In each cluster, the image closest to a mean content in the cluster may be selected as a representative image for annotation. Other suitable clustering methods may include mean-shift clustering and density-based spatial clustering of applications with noise (DBSCAN). In some examples, clustering may be applied to the image content or features thereof by using activations, for instance, from one or more layers of a neural network included in the encoder 506. Such approaches enable annotation of images that are representative of a variation of overall content in the set of images 504. Such approaches may benefit the training process by optimising the semantic information with regard to the set of images 502 gained from annotations.

Figure 6:
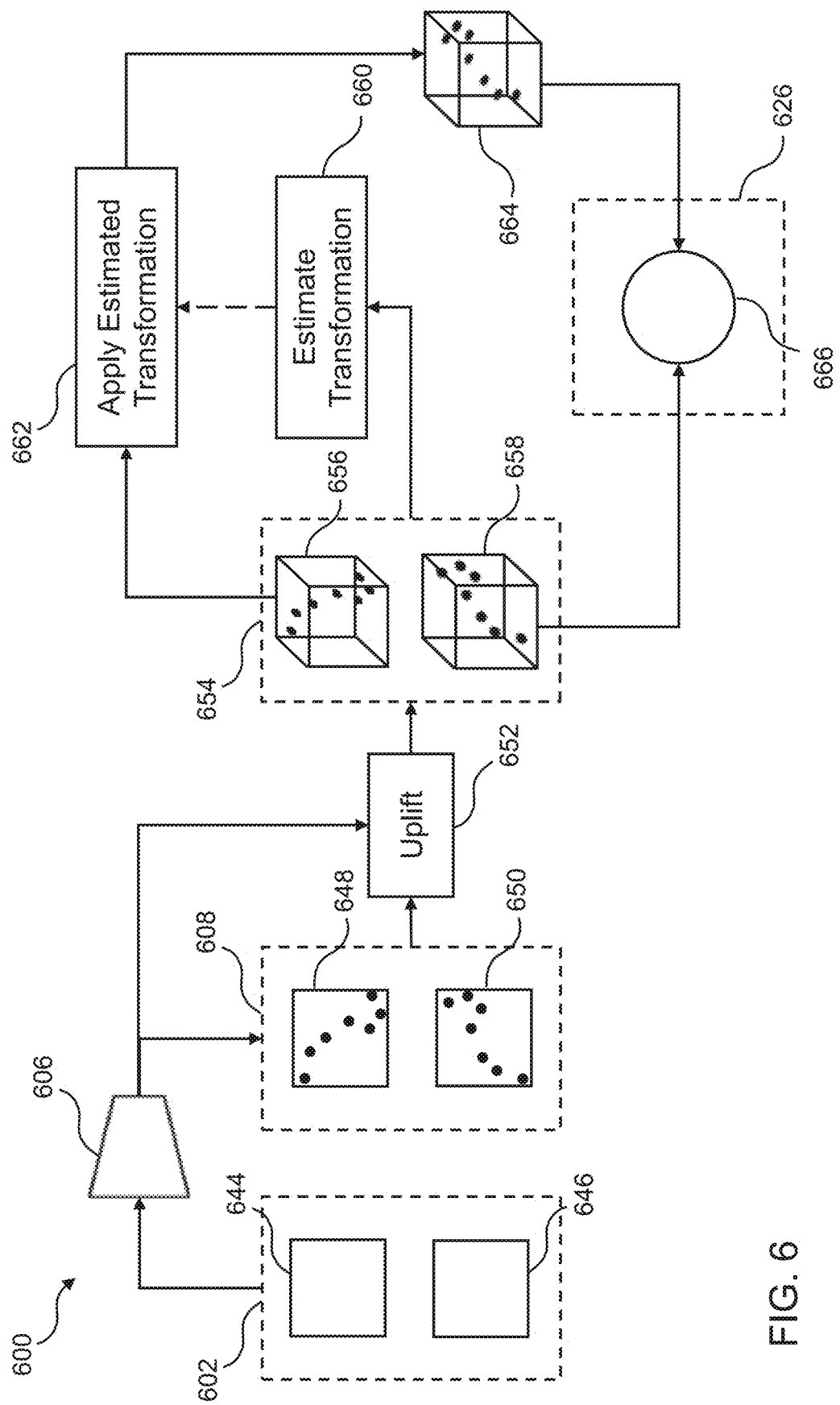
FIG. 6 schematically illustrates a second example of a method of training a machine learning model to identify locations of keypoints in images.

FIG. 6 schematically illustrates an example of a method 600 of training a machine learning model to identify locations of keypoints in images. The method 600 may include processing a set of images 602 using an encoder 606, similarly to examples discussed hereinbefore. Similar to the methods discussed thus far, the encoder 606 (which may be referred to as a detector) may include layers of an untrained or partially pre-trained neural network as well as other components as discussed hereinbefore. The set of images 602 in this example may include a source image 644 and a target image 646. The source and target images may depict a same object, although this may not be a requirement, as will be clarified hereinafter. On processing the source image 644 and the target image 646, the encoder 606 may detect inter alia a first point cluster 648 corresponding to the source image 644 and a second point cluster 650 corresponding to the target image 646. Points in the point clusters detected the encoder 606 may be coordinates representing locations for candidate keypoints in the corresponding images. In line with previous examples, the point cluster 648 and the point cluster 650 are shown to depict the Big Dipper group of stars in apparently different orientations. Specifically, the two detected point clusters appear to be rotated with respect to each other in the two-dimensional plane of the image (i.e. around an axis orthogonal to the image) by an angle of 90°. As before, the use of the Big Dipper group serves as an illustrative too, the actual candidate keypoints being able to adopt arbitrary locations dependent on the content of the source and target images. For example, in the context of human facial animation, the source and target images may both depict a human face or body in different orientations or poses. In other examples, the source and target images may not include a same object.

The method 600 may further include uplifting 652 the points of the point clusters in a higher dimensional space, for example a three-dimensional space. The process of uplifting 652 the points may include concatenating the coordinates representing the locations of the points in two-dimensional space with an additional coordinate indicating a location component in the added dimension. In some examples, the additional coordinate may represent an estimated depth in a direction orthogonal to the two-dimensional plane of the image. For example, in the context of human facial animation, the uplifting operation 652 may produce estimated depths of candidate keypoints identified along the lips. In other examples, the additional coordinate may represent a perspectival measure in a non-orthogonal direction, or may alternatively represent a non-geometrical coordinate such as colour.

A depth coordinate for a candidate keypoint in a point cluster detected by the encoder 606 may be estimated using a depth-aware map, which may be generated by the encoder 606. In such examples, a depth-aware map may be a two-dimensional array generated as an output of the encoder 606. In some examples, the value of a depth for a candidate keypoint may be obtained as a mathematical mean or expectation value of elements of the corresponding depth-aware map. For example, the value of the depth for a candidate keypoint may be determined as a sum of elements of the depth-aware map weighted by the corresponding probability values or heatmap values for that keypoint, calculated as described above. In other examples, a value for the depth of a candidate keypoint in the first detected cluster 648 or the second detected cluster 650 may be calculated from the depth-aware map by other operations. A depth value identified with a candidate keypoint may indicate a distance of the candidate keypoint orthogonal to a two-dimensional plane of the image. For example, estimates of the depth coordinate for candidate keypoints along a lip contour may indicate their relative depths by virtue of their curvature normal to the image plane.

In the example method 600 shown in FIG. 6, the uplifting operation 652 results in a set of outputs 654 including an uplifted first point cluster 656 for the first point cluster 648 corresponding to the source image 644. Similarly, an uplifted second point cluster 658 is produced for the second point cluster 650 corresponding to the target image 646. In this example, points in the point cluster continue to represent stars in the Big Dipper group but in three-dimensional space. As is apparent in FIG. 6, the relative estimated depths of the constituent points in the uplifted point clusters suggests that the two points clusters are not related any longer by a rotation within the two-dimensional plane of the image. Rather, the point clusters appear to be related by a more complicated set of rotations in three-dimensional space.

The method 600 may proceed to estimate a transformation 660 that may bring the uplifted first point cluster 656 closer to alignment with the uplifted second point cluster 658. For example, the transformation may be a similarity transformation, an affine transformation, a perspective transformation, a rigid transformation, or any combination thereof between sets of points in three-dimensional space. The transformation may be determined as one or more matrices whose values may be estimated using linear regression, by least squares for example. A subsequent step may include applying 662 the estimated transformation to the uplifted first point cluster 656 to obtain a candidate reconstruction 664 of the uplifted second point cluster 658. The estimated transformation 660 may be an approximation of the exact transformation mapping the uplifted first point cluster 656 to the uplifted second point cluster 658. Therefore, the application of the estimation transformation may not bring the second point cluster 658 and the candidate reconstruction 664 into perfect alignment. In this example, though the Big Dipper group is transformed considerably well by applying the estimated transformation 662, the candidate reconstruction 664 is close to, but deviates from, perfect alignment with the second point cluster 658. Such deviations serve as the basis for a penalizing term in the loss function 626 for the method 600. In this example, the loss function term 666 may include a comparison of the points in the candidate reconstruction 664 and the uplifted second point cluster 658. The corresponding reduction of the loss function 626 may follow the discussion hereinbefore. The method 600 thus includes a three-dimensional similarity of the detected point clusters as a training objective.

The transformational invariance in three-dimensional space may be beneficial in use cases wherein the object depicted undergoes a large viewpoint variation between the source and target images. In such cases, for example, when a human face is rotated by a large angle in three-dimensions, a two-dimensional transformational invariance may not be satisfactory. The estimated transformation 660 may be composed of one or more transformations, for example rigid transformations, each corresponding to a different subset of points in the point cluster 610. Further, the estimated transformation 660 may be applied to a subset of the points in the point cluster 610 or may alternatively map different points in the point cluster 610 to different extents. In some examples, points in the point cluster 610 for which the transformation is estimated may be chosen manually by user input. Such different facilities may enable the machine learning model to learn to correctly predict locations of points even under significant object articulation or partial deformation of an object.

FIG. 6 schematically illustrates a single training iteration for the method 600 of training a machine learning model. In other examples, a plurality of training iterations may be used to reduce the loss function 626 until, for example, convergence has been achieved or until another stopping criterion is satisfied, for example a predetermined number of iterations having taken place. Over the course of training, various components included in the method 600 may be varied. For example, the approach for selecting the source image 644 and the target image 646 may be varied. In some examples, either the source image 644 or the target image 646 or both may be chosen randomly from the set of images 602, resulting in the source and target images being paired randomly. This may, for instance, lead to selection of source and target images that depict a same object in wildly different configurations. The method 600 may therefore be modified to include a method of selecting source and target images that depict an object, rather, in a mildly different configuration. In this approach, the source image 644 and the target image may be selected to minimise a distance, for example Euclidean distance, between each other from amongst the set of images 602. In other examples, a combination of one or more alternative methods of selecting the source and target images may be adopted. In some examples, the method of selecting the source and target images may be varied over the course of training the machine learning model. Such variations over the course of training may be advantageous for the stability or convergence of the underlying optimisation using gradient descent or variant thereof.

Training objectives discussed thus far may be combined with other training objectives not shown in the Figures. For example, an additional equivariance objective may be included to supplement a training objective such as the image reconstruction objective of FIG. 1, the supervised objective of FIG. 5, and the three-dimensional similarity objective of FIG. 6. In this example, a transformation may first be determined or estimated. The transformation may include a two-dimensional similarity transform and/or may include transformations in one or more other spaces, such as a colour space (in which case the point cluster may further include information about colours associated with points in the point cluster. The determined or estimated transformation may be applied to the point cluster 110 corresponding to the selected image 104 to obtained a transformed point cluster. The transformation may also be applied to the selected image 104 to obtain a transformed image, which may subsequently be processed by the encoder 106 to provide a point cluster for the transformed image. A transformational equivariance objective may penalize deviations between the transformed point cluster and the point cluster for the transformed image. As discussed herein, penalization of deviations may be performed by including a suitable loss function term in the loss function 126.

In some examples, application of a determined transformation may result in mapping of the corresponding candidate keypoints to a location outside the image boundary. In such examples, the corresponding keypoints may be ignored during subsequent calculations. Alternatively, the transformation may be applied in a manner that yields a reduced extent of transformation, leading to candidate keypoints being mapped to locations within the image boundary. In some examples, an extent of the transformation may be varied over the course of training. For example, the extent of transformation resulting from the application of transformation may be a function of training iterations. In some examples, the extent of transformation may be a linear function of the training iteration. In other examples, the extent of transformation may be varied in a more complex manner over the course of training. Regardless of the functional dependence of the variation of transformation extents with the training iteration, a goal of such variations remains to mitigate reductions in performance of and/or achieve better stability or convergence of the underlying optimisation.

Figure 7:
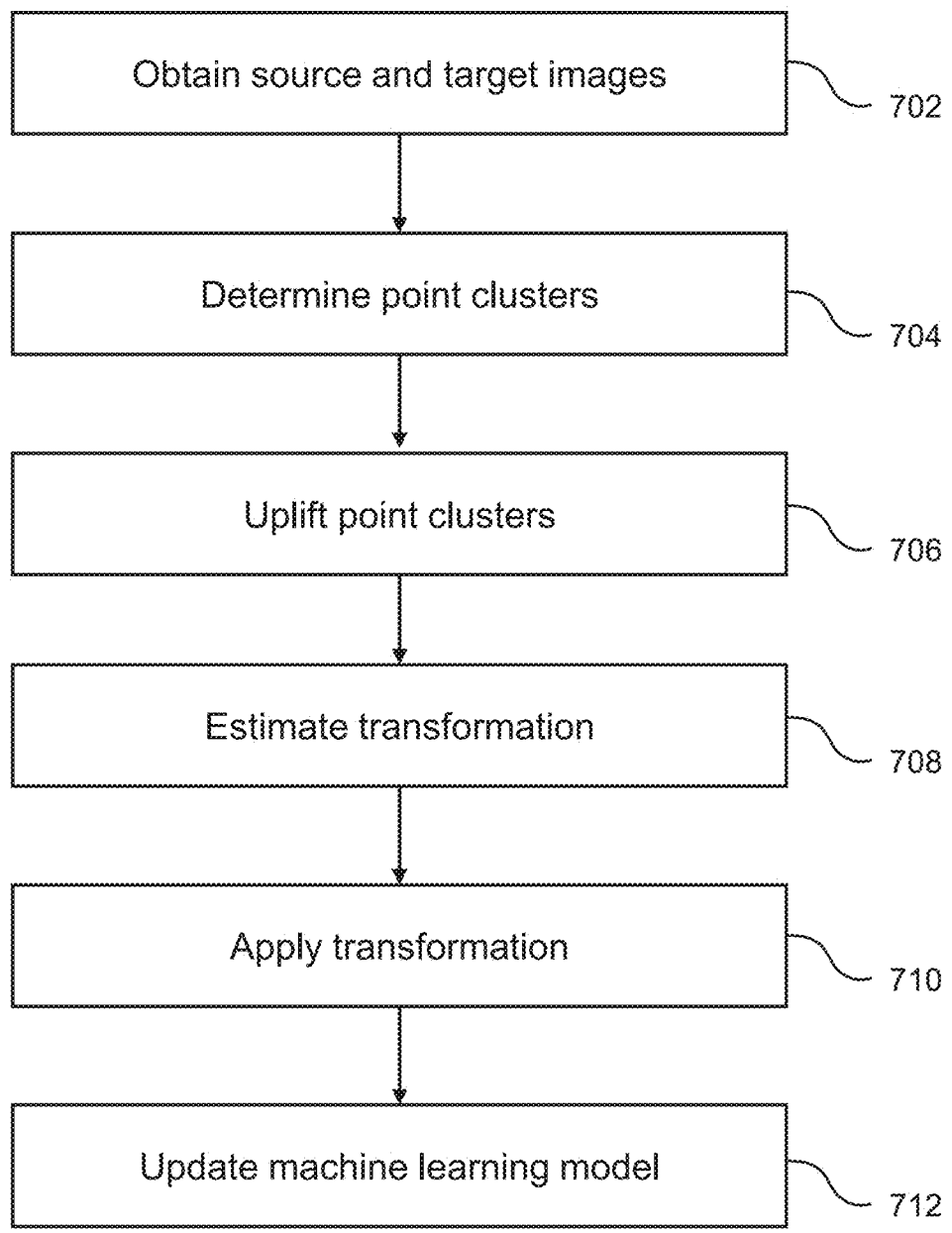
FIG. 7 shows a flow diagram representing a second example of a method of training a machine learning model to identify keypoints in images.

FIG. 7 shows a flow diagram representing a second example of a method of training a machine learning model to identify keypoints in images. In step 702, a source image and a target image are obtained, for each of which a point cluster is determined in step 704. Each point cluster may comprise points representing candidate keypoints for the respective image. The point clusters for the source and target images are individually uplifted in a three-dimensional space to obtain respective uplifted point clusters in step 706. A transformation in three-dimensional space mapping the uplifted source point cluster to the uplifted target point cluster is estimated in step 708. The transformation is applied to the source point cluster in step 710 to obtain a candidate reconstruction of the target point cluster. The point cluster for the target image and its candidate reconstruction are compared in step 712 to update the machine learning model. Updating the model may include reducing a loss function comprising a term penalizing a difference between point cluster for the target image and its candidate reconstruction.

Figure 8:
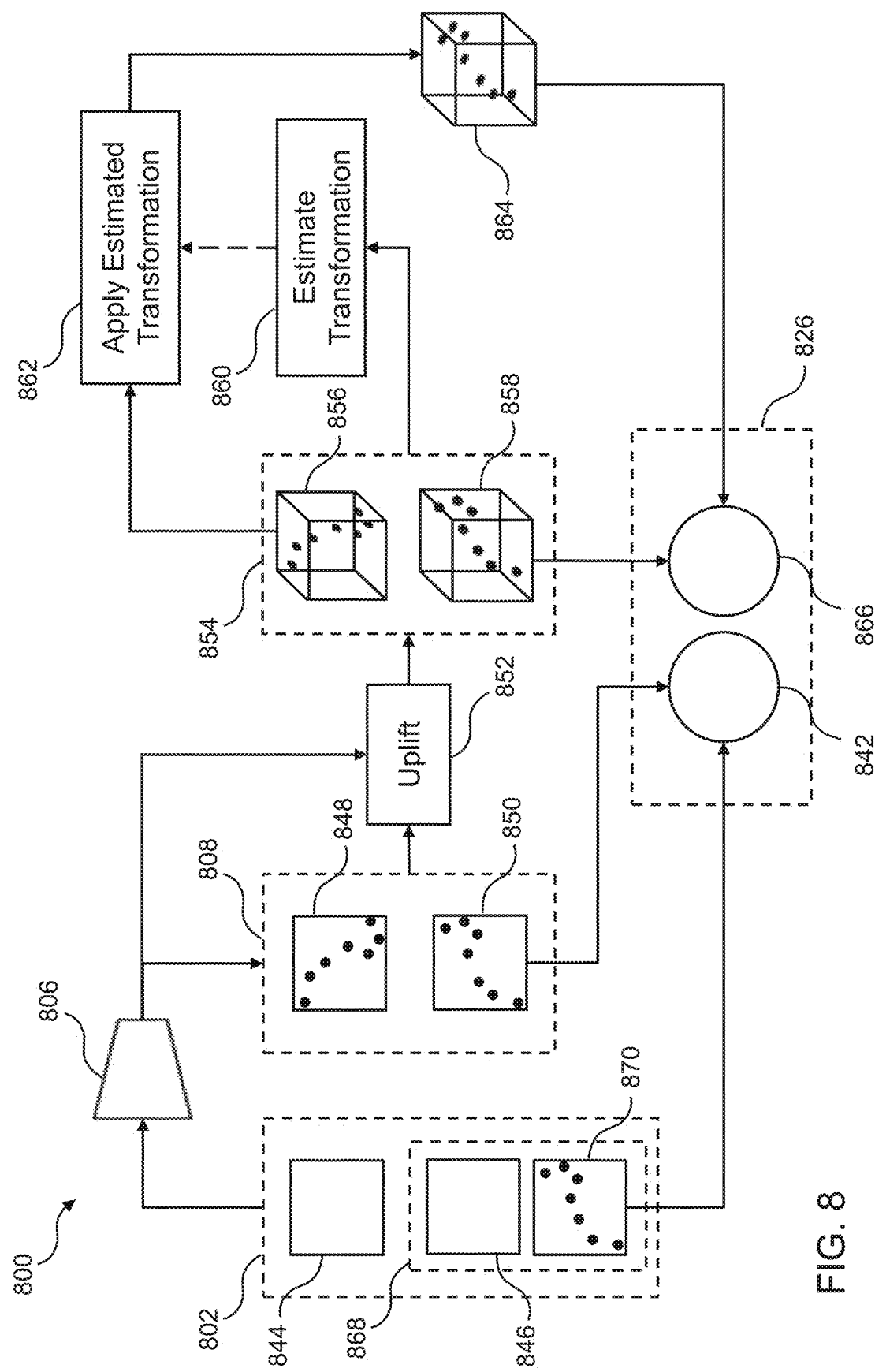
FIG. 8 schematically illustrates a second example of a supervised method of a machine learning model to identify locations of keypoints in images.

FIG. 8 schematically illustrates an example of a method 800 of training a machine learning model to identify locations of keypoints in images. The method 800 couples the supervision method described in FIG. 5 with the method 600 illustrated in FIG. 6. The set of images 802 may, therefore, include a subset of images 868 having annotations. In line with the earlier discussion, the annotations may be provided by user input. Alternatively, the annotations may be generated a priori by a machine or algorithm. Human annotated data may provide a semantic baseline to the machine learning model against which its training objectives may be evaluated. In this example, the target image 846 is shown coupled with a set of keypoint annotations 870. As in the previous examples, the annotated keypoints have been identified in the image frame in an illustrative shape of the Big Dipper group of stars. It is also apparent in FIG. 8 that annotated keypoint locations may differ from the locations of the candidate keypoints in the second point cluster 850 as detected by the encoder 806.

As discussed above, deviations in the detected point cluster 850 from the annotated keypoint locations may be penalized by adding to the loss function a term 842. The loss function term 842 may, for example, include a total or average distance between corresponding points over the subset of images 868 having annotations. Combining the loss function term 842 with the loss function term 866 may provide synergistic effects to the training process. Using annotated images as input to the encoder 806 may enhance its ability to recognise candidate keypoint locations. The training objective of achieving transformational invariance in a three-dimensional uplifting space enforced subsequently may thereby also be brought in line with a semantic baseline. As a result, the estimated values of the depth coordinate for points in the point cluster may become semantically consistent over the course of training. Conversely, enforcing the training objective of retaining transformational invariance in a three-dimensional space may reduce the number of annotated images required. In some examples, multiplicative coefficients may be assigned to the respective loss function terms to adjust the relative importance of each of the training objectives. In further examples, the values of such hyperparameters may be learned over the course of training on a set of images 802. A significant advantage of combining supervised training based on annotated images 868 and unsupervised learning is the converged values of hyperparameters may be applicable broadly to images outside the set of images 802. Values of hyperparameters obtained over a set of training iterations may be fixed prior to applying the trained machine learning model to new images, and therefore may not require alteration once obtained. Combining training methods discussed herein with the supervised training may support downstream tasks, such as editing and detailed manipulation of objects or parts thereof depicted in the images.

Figure 9:
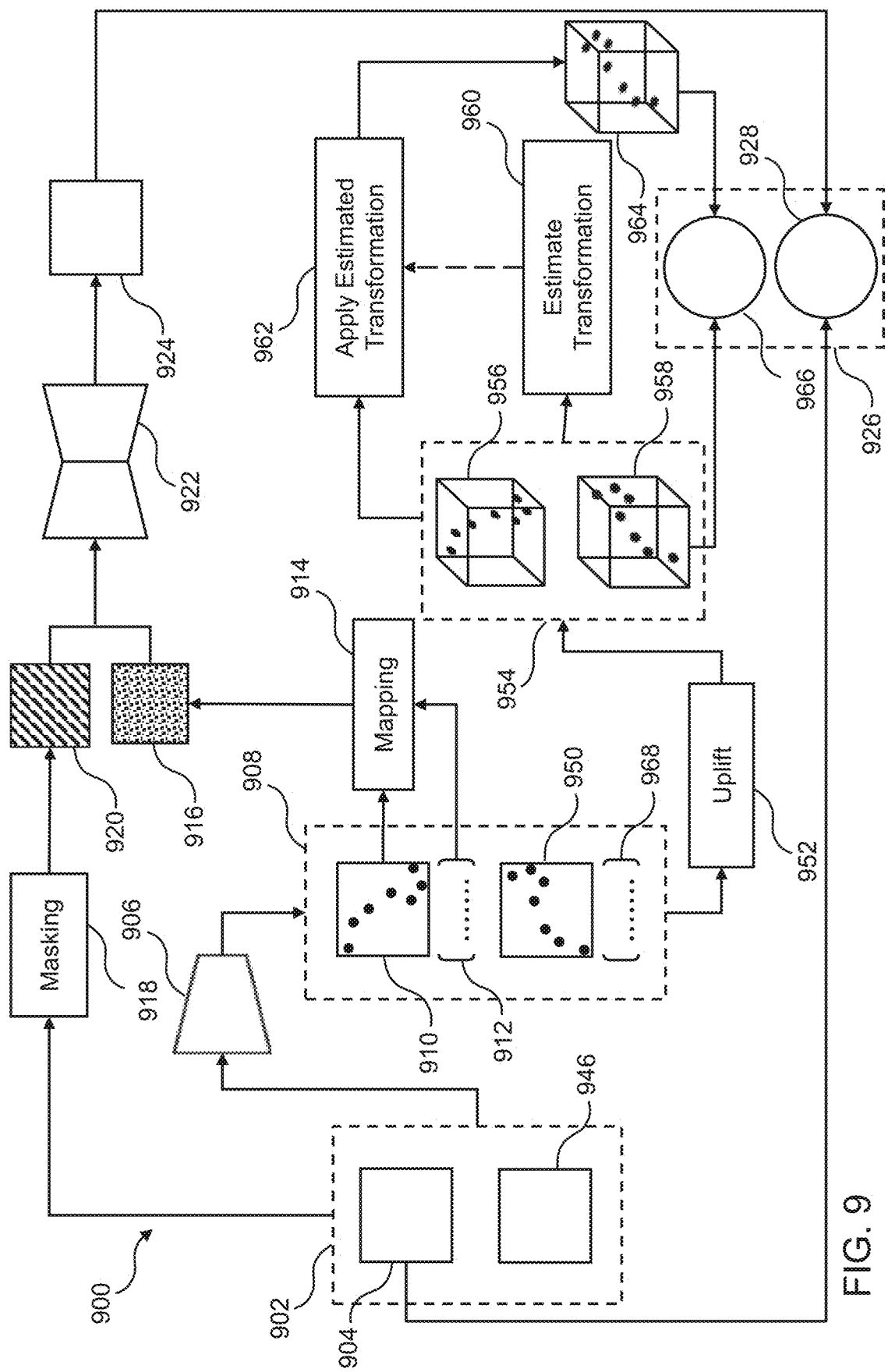
FIG. 9 schematically illustrates a third example of a method of a machine learning model to identify locations of keypoints in images.

FIG. 9 schematically illustrates an example of a method 900 of training a machine learning model to identify locations of keypoints in images. The method 900 combines the training objectives of image reconstruction (included in method 100) and three-dimensional transformation invariance (included in method 600). A similar approach may be followed in other examples, wherein the selected image 904 may serve as the target image. In the method 900, the encoder 906 may generate a set of outputs 908 including point clusters and sets of uncertainties for images in the set of images 902. For example, a first point cluster 910 and a first set of uncertainties 912 corresponding to the selected image 904 may be generated by the encoder 906. As discussed in the context of method 100, these may be provided as inputs to a mapping operation 914, which may ultimately lead to the creation of a candidate reconstructed image 924. The mapping operation 914 may include the use of a graph as taught in method 300 and method 400.

The set of outputs 908 may further include a second point cluster 950 and a second set of uncertainties 968 corresponding to a target image 946. Together, the first point cluster 910 (corresponding to the source image 904) and the second point cluster 950 (corresponding to the target image 946) may serve as inputs for the uplifting operation 952. The second set of uncertainties 968 may not be required in subsequent steps, though it is shown for consistency: an encoder 906 trained to generate a first set of uncertainties 912 for a first (source) image is expected to generate a second set of uncertainties 968 for a second (target) image. In line with the previous description, uplifting may be in a higher dimensional space, for example a three-dimensional space including an estimation of a coordinate value representing a depth. As discussed in method 600, the uplifting operation 952 may be part of a sequence of steps that lead to a comparison between the uplifted second point cluster 956 and its candidate reconstruction 964. The loss function terms 966 and 928 may be weighted using multiplicative coefficients that act as hyperparameters, which may be used to adjust the relative significance of each of the training objectives.

Figure 10:
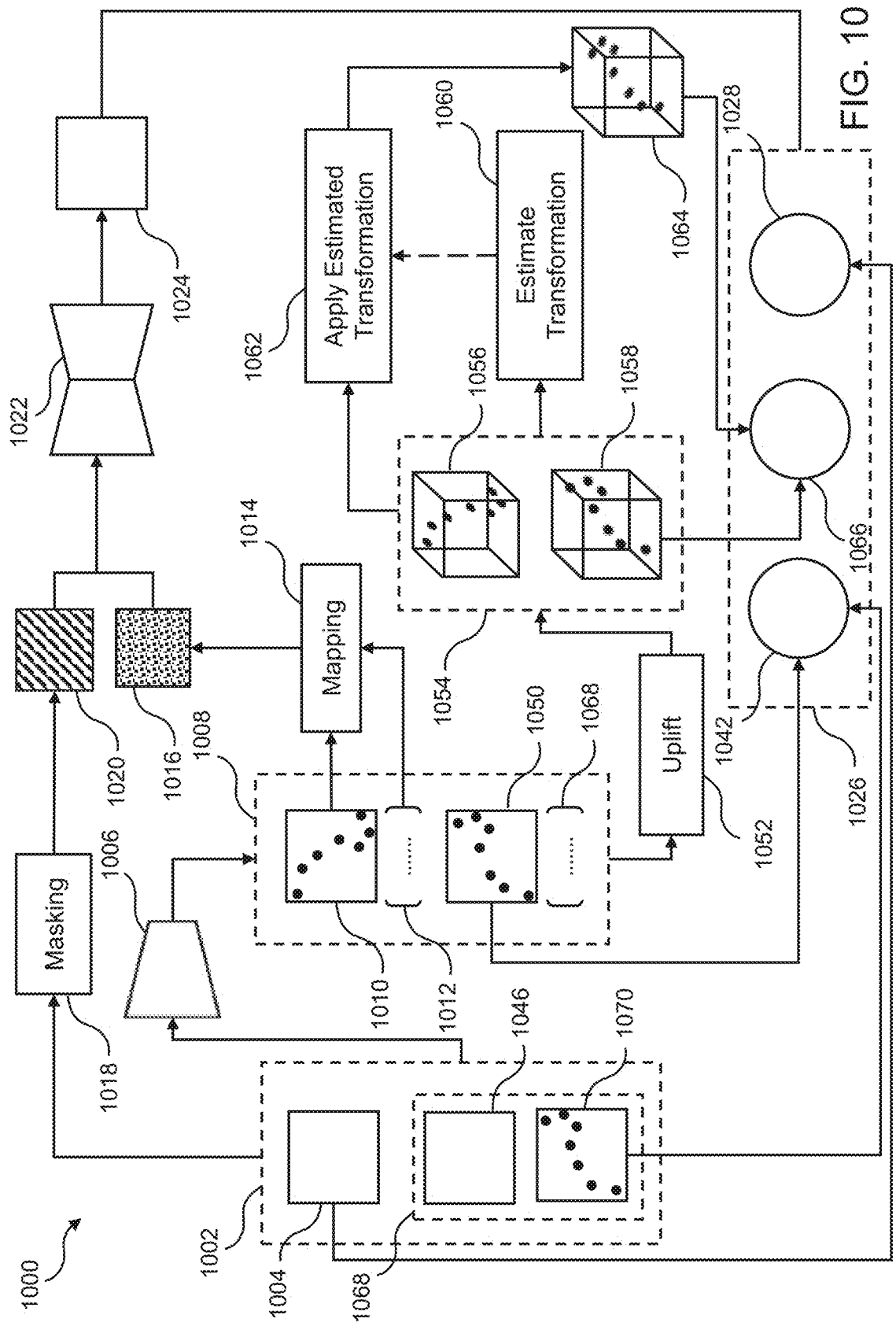
FIG. 10 schematically illustrates a fourth example of a method of a machine learning model to identify locations of keypoints in images.

FIG. 10 schematically illustrates an example of a method 1000 of training a machine learning model to identify locations of keypoints in images. In this example, the method 1000 is shown to include all three different training objectives discussed above. These include image reconstruction illustrated in method 100, supervision on annotated images illustrated in methods 500 and 800, and three-dimensional transformational invariance illustrated in method 600. In the example shown, the selected image 1004 for image reconstruction is the same as the source image for three-dimensional transformational invariance. Similarly, the target image 1046 for three-dimensional transformational invariance is the annotated image for the supervised training objective. Other combinations may be realisable, such as for example the selected image 1004 may have keypoint annotations, or the selected image 1004 may be the target image, and so on. Thus, one or more self-supervised training objectives such as explained in method 100 and 800 may be combined with the supervised training objective such as explained in method 500. Synergistic effects resulting from such combinations may significantly reduce the number of annotated examples that may be sufficient for adequate semantic consistency. In some examples, combination of one or more training objectives explained herein may adequately detect semantically meaningful candidate keypoints with up to 10, or up to 20 or up to 50 images having annotations.

As in other examples, the terms included in the loss function 1026 may be weighted by learnable hyperparameters to adjust the relative significance of the respective training objective. In one example, hyperparameters obtained from training on a set of images 1010 may be fixed and be applied for learning the remaining (model) parameters of the machine learning model on a separate set of images. Thus, a validation set of images 1010 may be used for obtaining the hyperparameters (loss function term coefficients), but other datasets may be used to tune the model parameters whilst sharing the hyperparameters obtained from the validation set. In such examples, the two sets of images may each depict a different category of objects. In this manner, the machine learning model may be trained to address data with diverse or general object distributions, rather than limited to a single domain. The resulting generality of the training method may enable broad downstream applications including fast dataset labelling and in-the-wild modelling and tracking of complex objects. In further examples, it may be possible to determine the hyperparameters by user input.

Figure 11A:
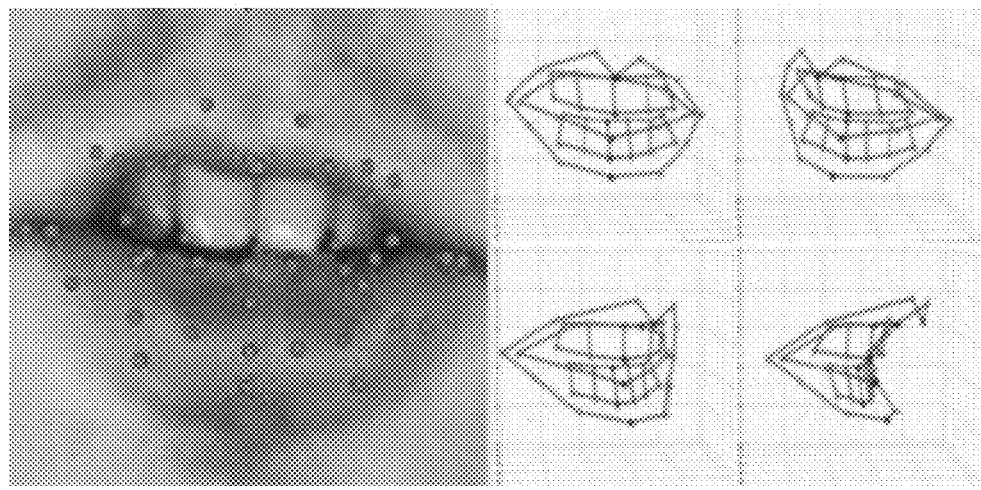
FIG. 11A shows an example depicting points in an image representative of candidate keypoints as determined using methods described herein.

FIG. 11A shows an example depicting points representative of candidate keypoints as determined by a machine learning model for an image. FIG. 11A (left) shows a point cluster determined by the machine learning model overlaid on the corresponding image depicting the interior of a human mouth. FIG. 11A (right) shows an example visualising uplifted point clusters as detected for a mouth with large viewpoint variations in three-dimensional space. Edges between the points in the point cluster denote correspond to edges of the graph.

Figure 11B:
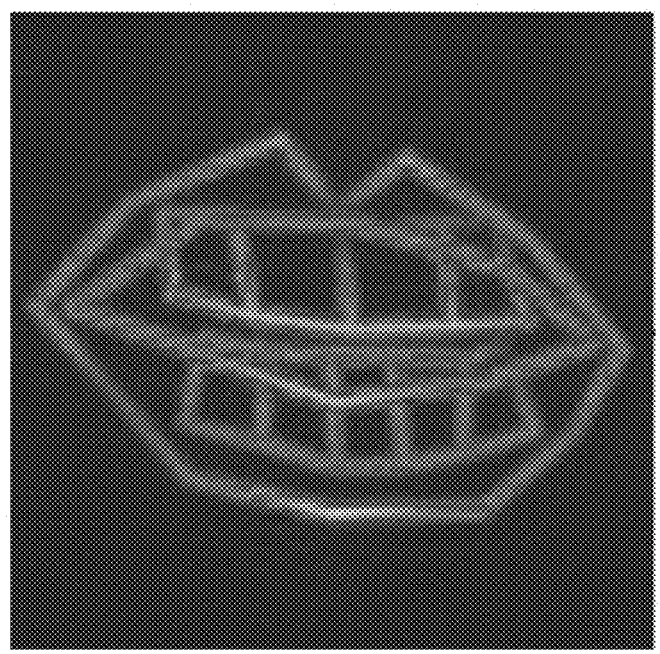
FIG. 11B shows an example depicting an uncertainty-aware edge map as generated using methods described herein.

FIG. 11B depicts a differentiable uncertainty-aware edge map as generated by a machine learning model processing the image of FIG. 11A. The variation of brightness shown in the map represents varying uncertainty associated with the corresponding locations in the image depicting the interior of a human mouth.

Figure 11C:
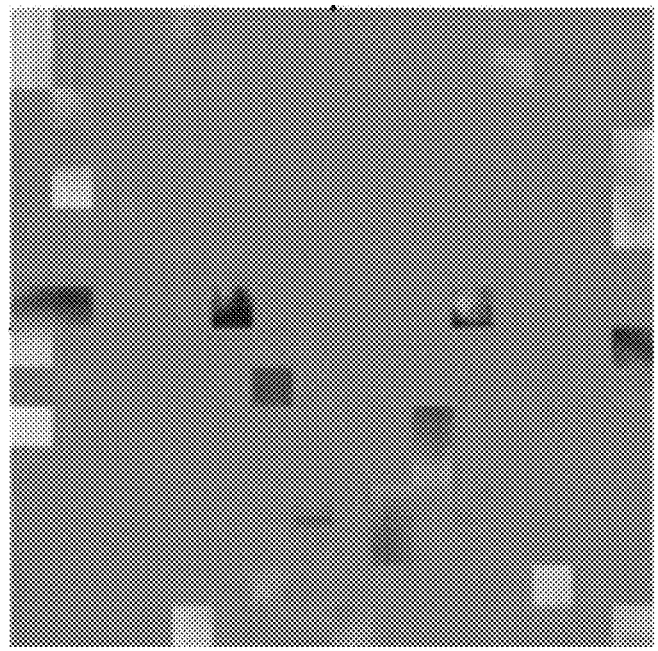
FIG. 11C shows an example depicting a masked version of the image of FIG. 11A.

FIG. 11C shows an example visualising a masked version of the image of FIG. 11A as obtained by applying a masking operation. The example shows that a substantial portion of the image (around 90%) has been masked for image reconstruction.

Figure 11D:
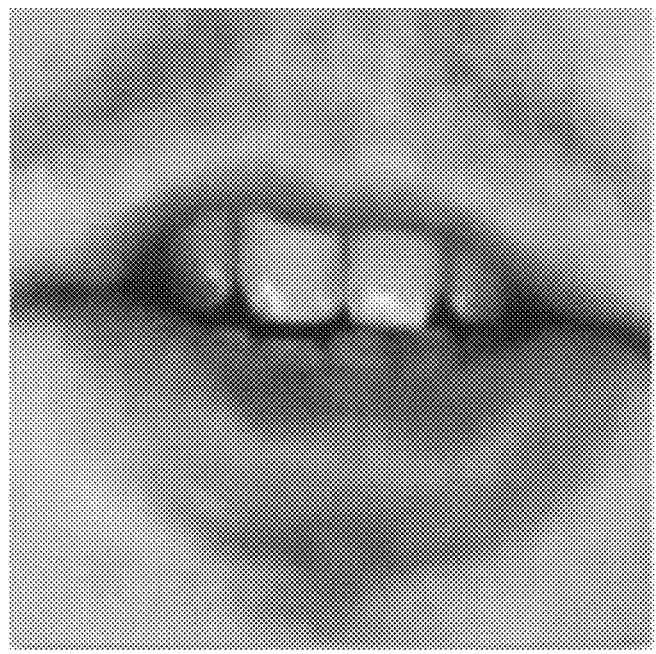
FIG. 11D shows an example illustrating a candidate reconstruction of the image of FIG. 11A as generated using methods described herein.

FIG. 11D illustrates a candidate reconstruction of the image of FIG. 11A as generated by a machine learning model provided with the masked version shown in FIG. 11C and the uncertainty-aware edge map of FIG. 11B.

Figure 12:
FIG. 12 shows examples in which methods described herein are applied to detect keypoints for a range of different objects.

FIG. 12 shows examples in which a machine learning model trained using a method corresponding to the method of FIG. 10 has been applied to detect keypoints for a diverse distribution of objects. The examples shown are indicative of a machine learning model with a fixed set of hyperparameters. Keypoints have been detected with a high degree of accuracy, even for highly articulated examples (such as that of the tiger) and for significant lighting variations (face and car).

At least some aspects of the examples described herein with reference to FIGS. 1-12 comprise computer processes or methods performed in one or more processing systems and/or processors. However, in some examples, the disclosure also extends to computer programs, particularly computer programs on or in an apparatus, adapted for putting the disclosure into practice. The program may be in the form of non-transitory source code, object code, a code intermediate source and object code such as in partially compiled form, or in any other non-transitory form suitable for use in the implementation of processes according to the disclosure. The apparatus may be any entity or device capable of carrying the program. For example, the apparatus may comprise a storage medium, such as a solid-state drive (SSD) or other semiconductor-based RAM; a ROM, for example, a CD ROM or a semiconductor ROM; a magnetic recording medium, for example, a floppy disk or hard disk; optical memory devices in general; etc.

The above examples are to be understood as illustrative examples of the invention. Further examples of the invention are envisaged. For example, invariance of the keypoints under a three-dimensional transformation may be leveraged for improved generalisation to extreme poses and for detecting keypoints on a wider set of object distributions. The examples discussed may also further constitute methods of image editing and conditional generative modelling, particularly those including limited annotated data. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

What is claimed is:

1. A system comprising at least one processor and at least one memory holding machine-readable instructions which, when executed by the at least one processor, cause the at least one processor to carry out operations comprising:
   obtaining a source image and a target image from a set of images;
   determining, by processing the source image using a machine learning model, a first point cluster comprising points representing candidate keypoints in the source image;
   determining, by processing the target image using the machine learning model, a second point cluster comprising points representing candidate keypoints in the target image;
   uplifting the first point cluster to a three-dimensional space to obtain an uplifted first point cluster;
   uplifting the second point cluster to the three-dimensional space to obtain an uplifted second point cluster;
   estimating a transformation in the three-dimensional space that maps the uplifted first point cluster to the uplifted second point cluster;
   applying the estimated transformation to the uplifted first point cluster to obtain a candidate reconstruction, in the three-dimensional space, of the uplifted second point cluster; and
   updating the machine learning model to reduce a loss function, the loss function comprising a term penalizing a difference between the uplifted second point cluster and the candidate reconstruction, in the three-dimensional space, of the uplifted second point cluster.

2. The system of claim 1, wherein the source image and the target image depict a same object.

3. The system of claim 1, wherein obtaining the target image comprises:
   evaluating differences between the source image and other images in the set of images; and
   selecting the target image as one of said other images having a least difference from the source image.

4. The system of claim 1, wherein the operations comprise randomly selecting the source image and the target image from the set of images.

5. The system of claim 1, wherein uplifting each of the determined point clusters to the three-dimensional space comprises estimating, using the machine learning model, a value of a depth coordinate for each point in that point cluster.

6. The system of claim 5, wherein estimating the value of the depth coordinate comprises:
   determining, using the machine learning model, a respective depth-aware map and a respective heatmap;
   calculating a sum of elements of the respective depth-aware map weighted in dependence on elements of the respective heatmap.

7. The system of claim 1, wherein the loss function comprises a term penalizing a difference between the first point cluster for the source image and a set of keypoint annotations for the source image.

8. The system of claim 7, wherein the operations comprise:
- partitioning the set of images into a plurality of partitions;
- selecting a representative image from each partition, the representative image designating a centroid of a variation amongst images in the partition; and
- annotating the representative image from each partition with a respective set of keypoint annotations;
- wherein the representative image from a first partition of the plurality of images is the source image.

9. The system of claim 1, wherein the loss function comprises a term penalizing a difference between the second point cluster for the target image and a set of keypoint annotations for the target image.

10. The system of claim 9, wherein the operations comprise:
- partitioning the set of images into a plurality of partitions;
- selecting a representative image from each partition, the representative image designating a centroid of a variation amongst images in the partition; and
- annotating the representative image from each partition with a respective set of keypoint annotations;
- wherein the representative image from a first partition of the plurality of images is the target image.

11. A computer-implemented method comprising:
- obtaining a source image and a target image from a set of images;
- determining, by processing the source image using a machine learning model, a first point cluster comprising points representing candidate keypoints in the source image;
- determining, by processing the target image using the machine learning model, a second point cluster comprising points representing candidate keypoints in the target image;
- uplifting the first point cluster to a three-dimensional space to obtain an uplifted first point cluster;
- uplifting the second point cluster to the three-dimensional space to obtain an uplifted second point cluster;
- estimating a transformation in the three-dimensional space that maps the uplifted first point cluster to the uplifted second point cluster;
- applying the estimated transformation to the uplifted first point cluster to obtain a candidate reconstruction, in the three-dimensional space, of the uplifted second point cluster; and
- updating the machine learning model to reduce a loss function, the loss function comprising a term penalizing a difference between the uplifted second point cluster and the candidate reconstruction, in the three-dimensional space, of the uplifted second point cluster.

12. The computer-implemented method of claim 11, wherein uplifting each of the determined point clusters to the three-dimensional space comprises estimating, using the machine learning model, a value of a depth coordinate for each point in that point cluster.

13. The computer-implemented method of claim 12, wherein estimating the value of the depth coordinate comprises:
- determining, using the machine learning model, a respective depth-aware map and a respective heatmap;
- calculating a sum of elements of the respective depth-aware map weighted in dependence on elements of the respective heatmap.

14. The computer-implemented method of claim 11, wherein the loss function comprises a term penalizing a difference between the first point cluster for the source image and a set of keypoint annotations for the source image.

15. The computer-implemented method of claim 11, wherein the loss function comprises a term penalizing a difference between the second point cluster for the target image and a set of keypoint annotations for the target image.

16. One or more non-transitory storage media comprising machine-readable instructions which, when executed by a computer, cause the computer to carry out operations comprising:
- obtaining a source image and a target image from a set of images;
- determining, by processing the source image using a machine learning model, a first point cluster comprising points representing candidate keypoints in the source image;
- determining, by processing the target image using the machine learning model, a second point cluster comprising points representing candidate keypoints in the target image;
- uplifting the first point cluster to a three-dimensional space to obtain an uplifted first point cluster;
- uplifting the second point cluster to the three-dimensional space to obtain an uplifted second point cluster;
- estimating a transformation in the three-dimensional space that maps the uplifted first point cluster to the uplifted second point cluster;
- applying the estimated transformation to the uplifted first point cluster to obtain a candidate reconstruction, in the three-dimensional space, of the uplifted second point cluster; and
- updating the machine learning model to reduce a loss function, the loss function comprising a term penalizing a difference between the uplifted second point cluster and the candidate reconstruction, in the three-dimensional space, of the uplifted second point cluster.

17. The one or more non-transitory storage media of claim 16, wherein uplifting each of the determined point clusters to the three-dimensional space comprises estimating, using the machine learning model, a value of a depth coordinate for each point in that point cluster.

18. The one or more non-transitory storage media of claim 17, wherein estimating the value of the depth coordinate comprises:
- determining, using the machine learning model, a respective depth-aware map and a respective heatmap;
- calculating a sum of elements of the respective depth-aware map weighted in dependence on elements of the respective heatmap.

19. The one or more non-transitory storage media of claim 16, wherein the loss function comprises a term penalizing a difference between the first point cluster for the source image and a set of keypoint annotations for the source image.

20. The one or more non-transitory storage media of claim 16, wherein the loss function comprises a term penalizing a difference between the second point cluster for the target image and a set of keypoint annotations for the target image.

* * * * *